UNITED STATES PATENT OFFICE 2,551,638

PRODUCTION OF LUBRICATING OILS BY CONDENSATION OF OLEFINIC HYDROCARBONS

Francis M. Seger, Pitman, and Alexander N. Sachanen, Woodbury, N. J., assignors to Socony-Vacuum Oil Company, Incorporated, a corporation of New York No Drawing. Application June 1, 1946,
Serial No. 673,892

6 Claims. (Cl. 260—683.15)

This invention relates to the condensation of monoolefinic hydrocarbons, and is more particularly concerned with the provision of a new process for effecting the interaction of monoolefinic hydrocarbons containing at least three carbon atoms per molecule with organic peroxides.

It is well known in the art to effect a union between molecules of unsaturated hydrocarbons to produce compounds, called polymers, the molecular weights of which are multiples of the molecular weights of the original hydrocarbons. The operation is called polymerization and the conditions of temperature, pressure, etc. are called polymerizing conditions.

As is well known to those familiar with the art, polymerization reactions of the type referred to hereinbefore, may be conducted at relatively high temperatures and pressures, or may be carried out at lower temperatures and pressures, in the presence of substances or of mixtures of substances, that promote the polymerization reaction. The substances are referred to as polymerization catalysts.

Several substances have been proposed as polymerization catalysts, and among the most widely used are phosphoric acid, sulfuric acid, hydrogen fluoride, aluminum chloride, boron trifluoride and solid alumina-silica absorbents. In polymerization processes involving the use of these substances as catalysts, the olefinic hydrocarbons are polymerized into polymeric olefinic hydrocarbons, the molecular weight of which, depending upon the conditions of polymerization, may vary within very broad limits from dimers to polymers containing many thousand carbon atoms. These products may be used as fuels, lubricants, plastics, etc., depending upon their molecular weights.

It is also well known to those familiar with the art, that ethylene and conjugated diolefinic hydrocarbons, such as butadiene, are readily polymerized in the presence of peroxides or oxygen. This has been embodied in numerous processes which are of considerable commercial importance in the production of high molecular weight plastics and elastomers. In contrast to the polymers formed in the polymerization of ethylene or of conjugated diolefinic hydrocarbons in the presence of acidic polymerization catalysts, the products obtained when peroxides or oxygen are utilized as polymerization catalysts are predominantly high molecular weight polymers.

On the contrary, monoolefinic hydrocarbons, other than ethylene, are not susceptible to peroxides or oxygen. Accordingly, it is well known that peroxides or oxygen do not promote the polymerization of monoolefinic hydrocarbons containing at least three carbon atoms.

We have now found that monoolefinic hydrocarbons containing at least three carbon atoms can be condensed with organic peroxides.

We have discovered that by using relatively large amounts of organic peroxides, monoolefinic hydrocarbons or their polymers actually react with organic peroxides to produce compounds containing structural elements of the organic peroxides.

Accordingly, it is an object of the present invention to provide a process for effecting the condensation of monoolefinic hydrocarbons containing at least three carbon atoms with organic peroxides. A very important object is to afford a process for the production of synthetic lubricating oils. Another important object is to provide a process for effecting the condensation of monoolefinic hydrocarbons having at least three carbon atoms with organic peroxides formed in situ. Other objects and advantages of the present invention will become apparent to those skilled in the art from the following description.

Broadly stated, the present invention provides a process for effecting the condensation of monoolefinic hydrocarbons having at least three carbon atoms per molecule, with organic peroxides, which comprises contacting the monoolefinic hydrocarbon reactants with an organic peroxide, under conditions of reaction to be described in detail hereinafter.

In general, any organic peroxide is suitable for our purpose. By organic peroxide we mean those organic compounds which contain a —O—O— linkage. In this connection, it must be clearly understood that when we speak of organic peroxides herein and in the claims, we have reference to organic hydroperoxides as well as simple organic peroxides. The organic peroxides utilizable in the process of the present invention may be aliphatic peroxides, aromatic peroxides, heterocyclic peroxides and alicyclic peroxides. Diethyl peroxide, tertiary butyl hydroperoxide, benzoyl peroxide, dimethylthienyl peroxide, cyclohexyl peroxide, and lauroyl peroxide may be mentioned by way of non-limiting examples of organic peroxides suitable for the process of our invention. In general, we prefer to use those organic peroxides containing the radical

wherein R is an aliphatic or aromatic radical, such as acetyl peroxide, and of these, we especially prefer to use those containing a benzene ring, such as benzoyl peroxide. The organic peroxides may be derived from any suitable source as is well understood and, advantageously, may be formed in situ, thereby obviating the necessity of using the relatively expensive commercial organic peroxides. Such a modification must be considered to be within the scope of the present invention and an important embodiment thereof.

The formation of the organic peroxides in situ may be accomplished in a number of ways. For example, they may be formed in accordance with the procedure of Price and Krebs [Organic Syntheses, 23, 65 (1943)], or by contacting oxygen or air, preferably, moist air, with a suitable organic compound such as a hydrocarbon, or an ether, which reacts therewith to form the desired organic peroxide. Ethyl benzene, cyclohexene, and tetralin which readily form peroxides on oxidation, may be mentioned by way of non-limiting examples of organic compounds utilizable for forming the organic peroxides in situ.

In general, and in accordance with our invention, the amounts of organic peroxide to be used are relatively large. In contrast to the polymerization reactions of the prior art which involve conjugated diolefinic hydrocarbons or ethylene, wherein organic peroxides function exclusively as catalysts in the widely accepted sense of the term, we have found that in our process, the decomposition products of organic peroxides combine with the polymers formed by the concurrent polymerization of the monoolefinic hydrocarbon reactants which the organic peroxides initially promote. Accordingly, the yields and nature of the products obtained in the process of the present invention depend upon the amounts of and reflect the type of the organic peroxides employed. For instance, when a monoolefinic hydrocarbon containing at least three carbon atoms per molecule is reacted with benzoyl peroxide in accordance with our process, polymers containing benzene rings and other structural fragments of the benzoyl peroxide will be formed. Viewed in this light, our process is one involving both polymerization and the broader and more comprehensive reaction-condensation.

Hence, in our process, the amounts of organic peroxides employed determine the yield and quality of product. Good results have been obtained using proportions of one mole of organic peroxide to ten moles of a given monoolefinic hydrocarbon reactant. In such cases, much of the monoolefinic hydrocarbon reactant has been recovered unreacted. On the other hand, excessive proportions of organic peroxides result in waste of these relatively expensive materials without achieving corresponding gains in desired product. Therefore, in our process, we employ organic peroxides in amounts varying between about 0.02 mole and about 0.3 mole per mole of monoolefinic hydrocarbon reactant, and preferably, between about 0.05 mole and about 0.2 mole per mole of monoolefinic hydrocarbon reactant.

In carrying out the process of the present invention, the organic peroxide is added to the monoolefinic hydrocarbon reactant preferably in two or more portions at intervals of a few hours. However, if desired, the organic peroxide may be added in a single addition without detracting unduly from the yields and quality of desirable product.

When the organic peroxide is formed in situ, a mixture of the monoolefinic hydrocarbon reactant containing at least three carbons per molecule, and an organic compound which forms an organic peroxide when subjected to oxidation, in amounts of at least about 5%, preferably at least about 20%, based on the weight of the monoolefinic hydrocarbon reactant, is contacted with oxygen (air for example) under the conditions of reaction to produce the organic peroxide in situ at the same time that the condensation reaction occurs. The contact with oxygen may be effected by agitation of the mixture in air, bubbling of the air through the mixture, etc. In another embodiment of this modification, an organic compound is peroxidized to a desired degree before the addition of the olefinic hydrocarbon reactant. Yet another modification is to use the monoolefinic hydrocarbon reactant per se for oxidation to the peroxide, with simultaneous or subsequent reaction to bring about the condensation of unreacted monoolefinic hydrocarbon reactant with that portion which has been converted to peroxide.

In accordance with the process of the present invention and depending upon the conditions of operation and the nature of the monoolefinic hydrocarbon reactants, various condensation products, from comparatively low-boiling to high-boiling fractions, can be synthesized. Thus, in our process, it is possible to produce fractions boiling within the range of those of lubricating oils, i. e., above 700° F. These products are of particular interest and importance. For example, synthetic lubricating oils obtained in accordance with our process have high viscosity indices, of the order of 100 or more, and the pour points may be low. In contrast to synthetic lubricating oils obtained in the processes of the prior art involving solely the polymerization of olefinic hydrocarbons, those of the present invention contain not only paraffinic chains but also other structural elements, depending upon the organic peroxide used, for example, aromatic rings, which may affect the properties, particularly the stability, of the synthetic lubricating oils produced. Further, the synthetic lubricating oils synthesized by the alkylation of aromatics with olefinic hydrocarbons or chlorinated alkanes will differ materially from those of our invention due to the very nature of the reactions involved. Thus, as is well known, the processes involving alkylation reactions utilize strong catalysts which induce a series of side reactions, such as cracking, isomerization, etc. On the other hand, in our process, the reaction is effected under conditions whereby side reactions, if any, are kept to a minimum, and the temperature conditions are comparatively mild. Accordingly, the utilization of our process for the manufacture of synthetic lubricating oils must be considered a preferred, but nevertheless non-limiting embodiment of our invention.

In general, any monoolefinic hydrocarbon having at least three carbon atoms, or any two or more monoolefinic hydrocarbons having at least three carbon atoms, may be used as the monoolefinic hydrocarbon reactant of our process. In this connection, it must be clearly understood that when we speak of a monoolefinic hydrocarbon reactant herein, we have reference to a normal or branched monoolefinic hydrocarbon having at least three carbon atoms per molecule, as well as a mixture of two or more monoolefinic hydrocarbons each having at least three carbon atoms per molecule. Butenes, propene, pentenes, decenes, cetenes, tridecenes, octadecenes, and dodecenes may be mentioned by way of non-limiting examples of monoolefinic hydrocarbons suitable for our process. We prefer to use normal monoolefinic hydrocarbons having at least three carbon atoms as the monoolefinic hydrocarbon reactants, and especially, the normal alpha-monoolefinic hydrocarbons, i. e., those normal monoolefinic hydrocarbons having a double bond adjacent the terminal carbon atoms, such as butene-1. The monoolefinic hydrocarbon reactants utilized in our process may be derived from any suitable source, as is well known in the art and they may be used either in the pure state or in admixture with other constituents not undesirable. A conventional and preferred source of the monoolefinic hydrocarbon reactants employed in the preferred embodiment of our invention, that of manufacturing synthetic lubricating oils, is a gasoline such as is obtained in cracking operations, or by the Fischer-Tropsch process, as is well understood in the art.

Generally speaking, when our process is operated to produce synthetic lubricating oils, normal alpha-monoolefinic hydrocarbons containing between about seven and about twelve carbon atoms per molecule are used. From the standpoint of obtaining a product having optimum lubricating properties, we have found that normal alpha-monoolefinic hydrocarbons containing about ten carbon atoms per molecule are to be preferred as reactants.

In general, we use temperatures varying between about 50° C. and about 300° C., depending upon the type of organic peroxide employed. Thus, when benzoyl peroxide is used, the temperature may vary between about 50° C. and about 150° C., and preferably, between about 80° C. and about 100° C. On the other hand, when hydroperoxides are used, the temperature may vary between about 100° C. and about 300° C., and preferably, about 175° C. The pressure to be employed depends upon the temperature used, and ordinarily, a pressure sufficient to maintain the reactants in substantially the liquid phase at the temperature employed, is adequate. The time of reaction depends, of course, upon the temperature, the nature of the reactants employed, and to a certain extent, upon the pressure. In general, the higher the temperature employed, the shorter the reaction time required, the criterion used being the time required at a given reaction temperature to effect condensation, and more specifically, to assure substantially complete consumption of the organic peroxide. For example, in batch operation, we have found that at a temperature of 85° C., the time of reaction is preferably over five hours.

The process may be carried out as a batch, continuous or semi-continuous type of operation. Particularly when the process is carried out on a commercial scale, economic considerations make it preferable to operate in a continuous manner. For efficient operation, whether the process is carried out on a batch or continuous basis, it is essential that the monoolefinic hydrocarbon reactant be intimately contacted with the organic peroxide. This may be effected in several ways and in apparatus which are well known in the art.

At the present time, the reaction mechanism involved in the process of the present invention is not fully understood. Nevertheless, and without any intent of limiting the scope of the present invention, it seems probable that the following reactions involving the free-radical mechanism occur, using benzoyl peroxide as an example:

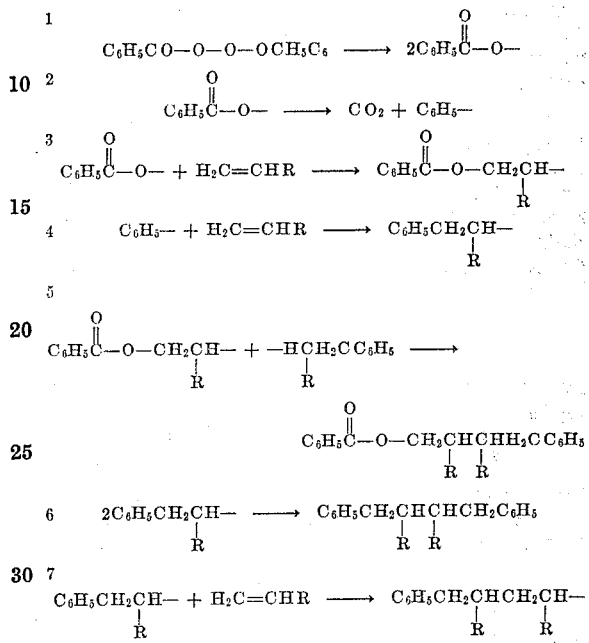

Reactions 1 and 2 are given commonly as the means by which free radicals can be formed. At temperatures of about 100° C., the amount of phenyl radical ($C_6H_5-$) exceeds the amount of benzoate radical

Reactions 3 and 4 are postulated as the beginning of a "chain" reaction. Reactions 5 and 6 are the termination of the "chain" in a sort of dimerization. Reaction 7 is a continuation of the "chain." The "chain" is short because the alkyl radical, R, makes the double bond relatively unsusceptible to continued addition of olefin links in the true "chain" reaction, as shown in reaction 7.

The following detailed examples are for the purpose of illustrating modes of carrying out the process of our invention. It is to be understood, however, that the invention is not to be considered as limited to the specific monoolefinic hydrocarbon reactants or to the specific organic peroxides and conditions of operation set forth therein. As it will be apparent to those skilled in the art, a wide variety of other monoolefinic hydrocarbon reactants and of other organic peroxides may be used.

EXAMPLE 1

224 grams of octene-1 (2 moles) were reacted with 16 grams of benzoyl peroxide (0.066 mole) for two hours at a temperature of 85–90° C. At the end of this time, another 16 grams of benzoyl peroxide were added and the reaction was permitted to continue for another two hours at a temperature of 85–90° C. Finally, at the end of this time, another 16 grams of benzoyl peroxide were added and the reaction was permitted to continue for five hours at a temperature of 85–90° C.

The excess octene-1 was then separated from the reaction product by distillation and the balance was subjected to vacuum distillation. A vacuum distillate and an oily residue were recovered from the vacuum distillation.

The liquid vacuum distillate weighed 44.9 grams and had a maximum boiling point of 200° C. at 3 mm. of mercury. The solid vacuum distillate weighed 7.4 grams and consisted predominantly of benzoic acid. The oily residue which weighed 89.3 grams had the following properties:

| | |
|---|---|
| Viscosity (Saybolt at 210° F.) ___seconds__ | 53.46 |
| Viscosity index _____ | 102.1 |
| Pour point _____below minus °F__ | 30 |
| Saponification number _____ | 82 |
| Bromine number _____ | 11.4 |
| Refractive index _____ | 1.4860 |
| Specific gravity _____ | 0.9036 |
| Neutralization number _____ | 1.8 |

EXAMPLE 2

The run set forth in Example 1 was repeated except that the three additions of benzoyl peroxide were of 32 grams (0.132 mole) each.

The results obtained were as follows:

| | Grams |
|---|---|
| Liquid vacuum distillate_____ | 63 |
| Solid vacuum distillate_____ | 37 |
| Oily residue _____ | 79 |

*Properties of oily residue*

| | |
|---|---|
| Viscosity (Saybolt at 210° F.) ___seconds__ | 69.01 |
| Viscosity index _____ | 101.2 |
| Pour point _____below minus °F__ | 30 |
| Saponification number _____ | 71 |
| Bromine number _____ | 15.8 |
| Refractive index _____ | 1.4921 |
| Specific gravity _____ | 0.9088 |
| Neutralization number _____ | 5.25 |
| Carbon content _____per cent__ | 83.38 |
| Hydrogen content _____do____ | 12.07 |
| Oxygen content (by difference) ____do____ | 4.55 |

EXAMPLE 3

The run set forth in Example 1 was repeated except that 252 grams of octadecene-1 were reacted with a total of 24 grams of benzoyl peroxide.

The results obtained were as follows:

| | Grams |
|---|---|
| Solid vacuum distillate_____ | 16.4 |
| Oily residue _____ | 91.7 |

*Properties of oily residue*

| | |
|---|---|
| Viscosity (Saybolt at 210° F.) ___seconds__ | 70.55 |
| Viscosity index _____ | 132.5 |
| Saponification number _____ | 39 |
| Bromine number _____ | 6.7 |
| Refractive index _____ | 1.4773 |
| Specific gravity _____ | 0.8735 |
| Neutralization number _____ | 1.35 |

EXAMPLE 4

252 grams of octadecene-1 were reacted with 8 grams of benzoyl peroxide for two hours at a temperature of 85–90° C. At the end of this time, another 8 grams of benzoyl peroxide were added and the reaction was permitted to continue for another two hours at a temperature of 85–90° C. The reaction for two hours at temperatures of 85–90° C. with additional 8-gram portions of benzoyl peroxide was repeated until a total of 48 grams of benzoyl peroxide was added. After the last addition, the reaction was permitted to continue for five hours.

The results obtained were as follows:

| | Grams |
|---|---|
| Solid vacuum distillate_____ | 17.9 |
| Oily residue _____ | 108.4 |

*Properties of oily residue*

| | |
|---|---|
| Viscosity (Saybolt at 210° F.) ___seconds__ | 73.91 |
| Viscosity index _____ | 130.9 |
| Pour point _____°F__ | 65 |
| Saponification number _____ | 42 |
| Bromine number _____ | 6.5 |
| Refractive index _____ | 1.4790 |
| Specific gravity _____ | 0.8767 |
| Neutralization number _____ | 0.60 |
| Carbon content _____per cent__ | 84.31 |
| Hydrogen content _____do____ | 13.01 |
| Oxygen content (by difference) ____do____ | 2.68 |

EXAMPLE 5

The run set forth in Example 1 was repeated except that the three additions of benzoyl peroxide were replaced with three additions of 16 grams of 60% tertiary butyl hydroperoxide (0.106 mole) each, and that the temperature of reaction was 95–100° C.

The results obtained were as follows:

| | Grams |
|---|---|
| Liquid vacuum distillate (boiling up to 196° C. at 1 mm.)_____ | 16 |
| Oily residue _____ | 13 |

*Properties of oily residue*

| | |
|---|---|
| Viscosity (Saybolt at 210° F.) ___seconds__ | 43.73 |
| Viscosity index _____ | 102.5 |
| Saponification number _____ | 38 |
| Bromine number _____ | 17.3 |
| Refractive index _____ | 1.4676 |
| Specific gravity _____ | 0.8844 |
| Neutralization number _____ | 7.5 |

*Formation of organic peroxide in situ*

EXAMPLE 6

In this run, the organic peroxide was formed in situ in accordance with the procedure of Price and Krebs.

56.2 grams of benzoyl chloride (0.4 mole) were dissolved in 224 grams of octene-1 (2 moles) and the solution was then added to an aqueous solution of sodium peroxide containing 20 grams (0.26 mole) of the latter. The mixture was kept for 1½ hours at a temperature of 5° C. and at the end of this time, the lower layer was separated.

The olefin layer together with a considerable quantity of crystalline solid was then heated to a temperature of 80° C. and kept at this temperature for ten hours.

Excess octene-1 was removed by distillation. The residue crystallized on cooling and was treated with ether and pentane to precipitate benzoic acid as filterable crystals. The oily material was concentrated by evaporation. Only 29 grams of oil were obtained. This oil had a specific gravity of approximately 0.922.

EXAMPLE 7

In this run, the organic peroxide was formed in situ using moist air as oxidizing agent.

100 grams of ethyl benzene (0.94 mole) were blown with moist air for three hours at a temperature of 112° C.

224 grams of octene-1 (2 moles) were then added to the ethyl benzene and blowing was continued for 19½ hours at a temperature of 97° C.

Excess octene-1 and ethyl benzene were removed by distillation. The residue was topped to a liquid temperature of 180° C. The topped oily residue weighed 53 grams, had a specific gravity of approximately 0.895 and resembled the products obtained in the runs set forth in Examples 1 and 2.

EXAMPLE 8

115 grams of methyl thiophene (1.17 moles) were blown with moist air for three hours at a temperature of 75° C.

224 grams of octene-1 (2 moles) were then added to the methyl thiophene and blowing was continued for 23⅔ hours at a temperature of 103° C.

Excess methyl thiophene and octene-1 were then removed by distillation and the residue after topping to a liquid temperature of 180° C. weighed 32 grams. The residue had the following properties:

Viscosity (Saybolt at 100° F.) ____seconds__ 49.23
Viscosity index _____ about 68
Neutralization number _____ 17.55
Bromine number _____ 29.0
Specific gravity _____ 0.9141
Sulfur content _____per cent__ 3.37

It will be apparent that the present invention provides an efficient and commercially feasible process for effecting the condensation of monoolefinic hydrocarbons containing at least three carbon atoms with organic peroxides. Our process is of considerable value in the manufacture of synthetic lubricating oils, as well as in the manufacture of specific organic compounds important as intermediates in organic syntheses.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. The process for manufacturing a synthetic lubricating oil having a low pour point, a high viscosity index and high stability, which comprises contacting, in a reaction zone at a temperature falling within the range varying between about 50° C. and about 300° C., a charge consisting essentially of normal-alpha-monoolefinic hydrocarbons having between about seven and about twelve carbon atoms per molecule, with an organic peroxide in amounts of at least about 0.02 mole per mole of said normal-alpha-monoolefinic hydrocarbons, and for a period of time sufficient to effect condensation.

2. The process for manufacturing a synthetic lubricating oil having a low pour point, a high viscosity index and high stability, which comprises contacting, in a reaction zone at a temperature falling within the range varying between about 80° C. and about 200° C., a charge consisting essentially of normal-alpha-monoolefinic hydrocarbons having between about seven and about twelve carbon atoms per molecule, with an organic peroxide in amounts varying between about 0.05 mole and about 0.2 mole per mole of said normal-alpha-monoolefinic hydrocarbons, and for a period of time sufficient to effect condensation.

3. The process for manufacturing a synthetic lubricating oil having a low pour point, a high viscosity index and high stability, which comprises contacting, in a reaction zone at a temperature falling within the range varying between about 50° C. and about 150° C., a charge consisting essentially of normal-alpha-monoolefinic hydrocarbons having between about seven and about twelve carbon atoms per molecule, with an organic peroxide containing the benzene ring, in amounts varying between about 0.02 mole and about 0.3 mole per mole of said normal-alpha-monoolefinic hydrocarbons, and for a period of time sufficient to effect condensation.

4. The process for manufacturing a synthetic lubricating oil having a low pour point, a high viscosity index and high stability, which comprises contacting, in a reaction zone at a temperature falling within the range varying between about 80° C. and about 100° C., a charge consisting essentially of normal-alpha-monoolefinic hydrocarbons having between about seven and about twelve carbon atoms per molecule, with benzoyl peroxide in amounts varying between about 0.05 mole and about 0.2 mole per mole of said normal-alpha-monoolefinic hydrocarbons, and for a period of time sufficient to effect condensation.

5. A synthetic lubricating oil having a low pour point of at least about −30° F., a high viscosity index above about 100 and high stability, obtained by contacting, in a reaction zone at a temperature falling within the range varying between about 50° C. and about 300° C., a charge consisting essentially of normal-alpha-monoolefinic hydrocarbons having between about seven and about twelve carbon atoms per molecule, with an organic peroxide in amounts of at least about 0.02 mole per mole of said normal-alpha-monoolefinic hydrocarbons, and for a period of time sufficient to effect condensation.

6. A synthetic lubricating oil having a low pour point of at least about −30° F., a high viscosity index above about 100 and high stability, obtained by contacting, in a reaction zone at a temperature falling within the range varying between about 80° C. and about 100° C., a charge consisting essentially of normal-alpha-monoolefinic hydrocarbons having between about seven and about twelve carbon atoms per molecule, with benzoyl peroxide in amounts varying between about 0.05 mole and about 0.2 mole per mole of said normal-alpha-monoolefinic hydrocarbons, and for a period of time sufficient to effect condensation.

FRANCIS M. SEGER.
ALEXANDER N. SACHANEN.

REFERENCES CITED

The following references are of record in the file of this patent:

UNITED STATES PATENTS

| Number | Name | Date |
|---|---|---|
| 1,981,819 | Wiezevich et al. | Nov. 20, 1934 |
| 2,388,138 | Greenewalt | Oct. 30, 1945 |
| 2,450,451 | Schmerling | Oct. 5, 1948 |

OTHER REFERENCES

Sullivan et al.: Industrial and Engineering Chemistry, vol. 23, No. 6 (1931), pages 604–610.